C. B. NICHOLS.
VEHICLE WHEEL.
APPLICATION FILED AUG. 9, 1909.
956,724.
Patented May 3, 1910.
2 SHEETS—SHEET 2.
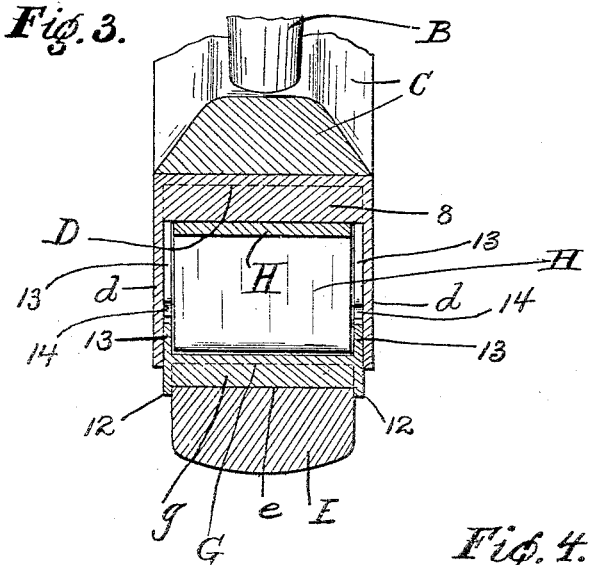
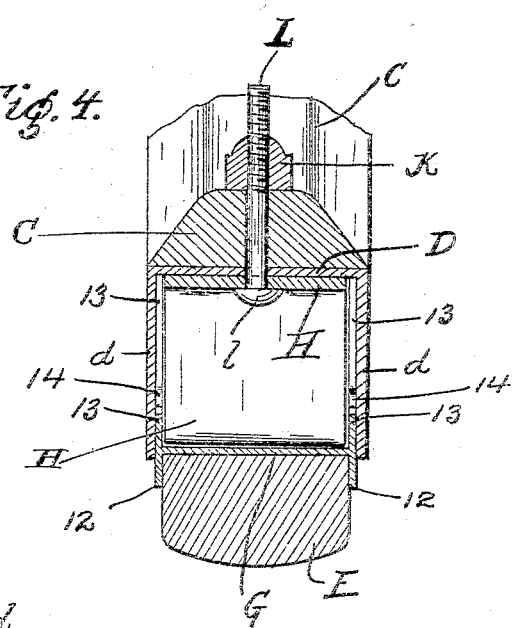
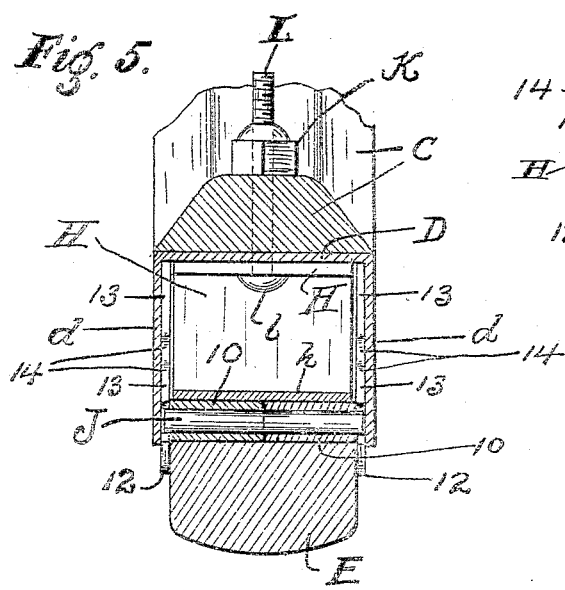
Witnesses:
H. J. Gettins.
B. C. Brown.
Inventor:
Charles B. Nichols
By
his Attorneys.

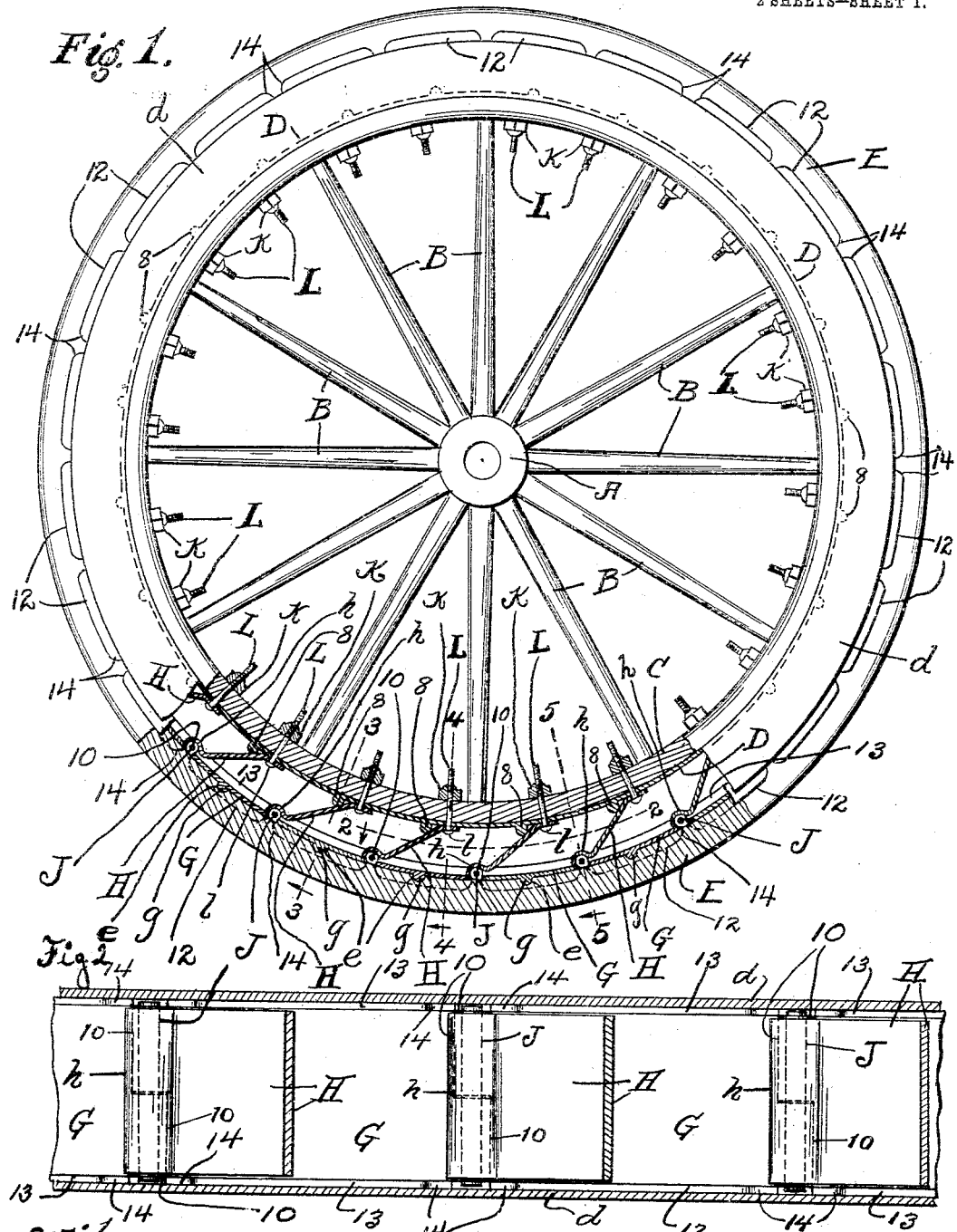

UNITED STATES PATENT OFFICE.

CHARLES B. NICHOLS, OF ROCKPORT, OHIO.

VEHICLE-WHEEL.

956,724. Specification of Letters Patent. Patented May 3, 1910.

Application filed August 9, 1909. Serial No. 511,939.

*To all whom it may concern:*

Be it known that I, CHARLES B. NICHOLS, a citizen of the United States of America, residing at Rockport village, in the county of Cuyahoga and State of Ohio, have invented certain new and useful Improvements in Vehicle-Wheels; and I hereby declare the following to be a full, clear, and exact description of the invention, such as will enable others skilled in the art to which it pertains to make and use the same.

This invention relates to improvements in vehicle-wheels, and pertains more especially to a wheel having a solid rubber or elastic and compressible tire which is cushioned at its inner circumferentially extending surface by leaf-springs arranged between the said surface and the rim of the wheel and spaced and extending circumferentially of the rim.

One object of this invention is to provide a flexible tire-holder composed of sections which extend along the inner circumferentially extending surface of the tire and to have adjacent sections of the tire-holder pivoted together parallelly with the axis of the wheel and thereby render the tire more flexible, and to apply the springs so that the latter will act to press the said sections of the tire-holder outwardly.

Another object is to provide each section of the tire-holder with a rib or member which projects into a cavity formed in the tire and is instrumental in preventing creeping of the tire circumferentially of the wheel.

Another object is to have each spring bear outwardly against adjacent sections of the tire-holder at a point adjacent the pivotal connection between the said sections.

Another object is to inexpensively but adequately protect or guard the springs without interfering with the flexibility of the tire and sections of the tire-holder.

Another object is to provide a vehicle-wheel of the character indicated which is simple and durable in construction, and whose component parts are readily assembled, not liable to get out of order and conveniently accessible for repairs or renewal.

With these objects in view, and to the end of realizing any other advantages hereinafter appearing, this invention consists in certain features of construction, and combinations and arrangement of parts, hereinafter described, pointed out in the claims and illustrated in the accompanying drawings.

In the said drawings, Figure 1 is an elevation partially in section, of a vehicle-wheel embodying my invention. Fig. 2 is a section taken along the curved line 2—2, Fig. 1, looking downwardly. Figs. 3, 4 and 5 are transverse sections on line 3—3, line 4—4, and line 5—5, respectively, Fig. 1, looking in the direction indicated by the arrow.

Referring to Fig. 1 of the drawings, A indicates the hub of my improved vehicle-wheel; B, the spokes, and C the rim. The spokes are arranged radially of the wheel and spaced equidistantly circumferentially of the hub in the usual manner. The spokes are secured at their inner ends to the hub in any approved manner and are suitably attached at their outer ends to the rim. The rim is annular and arranged concentrically relative to the hub and provided with a metal band D, preferably of cast metal, which surrounds or extends circumferentially of the rim. The band D is provided externally with two corresponding outwardly projecting annular and parallel laterally spaced flanges $d$ and $d$ which extend circumferentially of the band.

E indicates the solid tire of the wheel. The tire is composed of rubber or any elastic and compressible material. The tire is arranged concentrically relative to the rim C and is enough larger in internal diameter than the external diameter of the rim to form an annular space between the rim and the tire and thereby accommodate the location, between the tire and the rim, of leaf-springs H which are employed in cushioning the tire. The said springs are contained within and extend diagonally of the space between the tire and the wheel-rim and are arranged and spaced circumferentially of the rim. Each spring is removably secured to the rim by a bolt L and a nut K. The said bolt is arranged radially of the wheel and has its shank extending loosely through the respective spring, rim-surrounding band and rim and a suitable distance inwardly beyond the inner circumferentially extending surface of the rim and has its head $l$ overlapping the outer side of the spring, and the said nut is mounted on the shank of the bolt at the said surface of the rim. The springs H form a resilient and flexible connection between the wheel-rim and the tire, and are normally under tension and applied to cause pressure to be exerted outwardly against the inner circumferentially extending surface of the tire.

An annular tire-holder extends along and engages the inner circumferentially extending surface of the tire between the latter and the springs H and extends therefore around the rim and is composed preferably of cast-metal sections G which engage and extend along the said surface of the tire. Adjacent sections G of the tire-holder are shown pivotally connected together at their adjacent ends by a pin J which is arranged horizontally and parallel with the axis of the wheel and extends through or into lugs 10 formed on the said sections, which lugs are arranged in line transversely of the said sections at the inner sides of the sections and embraced and engaged by the outer end of a spring H, which end is bent or curves around or circumferentially of the said lugs and presses outwardly against the said lugs and thereby causes pressure to be exerted outwardly against the inner circumferentially extending surface of the tire adjacent the pivotal connection between the said sections of the tire-holder.

Each spring H between the curved or pressure-exerting end thereof and the point at which the said spring is attached to the wheel-rim C has bearing on a rib or member 8 formed on and arranged transversely of the band D and projecting outwardly from the band into the space formed between the wheel-rim and the tire. The said bearing for the spring prevents any undue strain upon the bolt attaching the spring to the rim when the tire of the wheel strikes an obstruction on the roadway at a point adjacent the pressure-exerting end of the spring.

Each section G of the tire-holder is provided preferably centrally between its ends with a rib or member $g$ which is arranged transversely of the said section and projects into a cavity $e$ formed in the tire and is therefore instrumental in preventing creeping of the tire circumferentially of the wheel-rim.

Each section G of the tire-holder is provided externally with two outwardly projecting flanges 12 and 12 which overlap opposite sides respectively of the tire E and prevent displacement of the tire laterally from the tire-holder. Obviously the flanges $d$ of the band D prevent lateral displacement of the sections G of the tire-holder.

Each section G of the tire-holder is provided internally with two corresponding inwardly projecting laterally spaced and substantially parallel flanges 13 and 13 which are loosely overlapped at their outer side by opposite flanges $d$ and $d$ respectively of the band D. It will be observed therefore that the flanges 13 of the sections of the tire-holder and the flanges $d$ of the band D constitute means for preventing displacement of the tire-holder transversely of the wheel-rim.

By the construction hereinbefore described it will be observed that upon withdrawing the nuts K from the bolts L the springs H are rendered inoperative and loose enough relative to the sections G of the tire-holder to render the latter loose relative to the tire and thereby permit the removal of the tire for repairs or replacement, and that the pivotal connection between adjacent sections of the tire-holder, when the springs are rendered inoperative upon the withdrawal of the nuts K, render the tire-holder flexible to such an extent as to enable the removal of the tire with facility. Of course the springs H and the band D are efficiently secured to the wheel-rim upon tightening the nuts K after a proper assemblage of the parts. It will also be observed that the springs are arranged between the flanges $d$ of the band D and between the flanges 13 and 13 of the sections G of the tire-holder; that the said flanges form guards protecting the springs, and that the flanges 12 and 13 of the said sections G are cut away at the ends, as at 14, to avoid interference with the flexibility of the tire-holder.

What I claim is;—

1. In a vehicle-wheel, the combination, with the rim of the wheel, and a tire extending circumferentially of the rim and enough larger in internal diameter than the external diameter of the rim to form an annular space between the tire and the rim, of a tire-holder comprising sections extending along the inner circumferentially extending surface of the tire, adjacent sections of the tire-holder being provided at their adjacent ends with lugs which are arranged in line transversely of the said sections and pivoted together parallelly with the axis of the wheel, and leaf-springs arranged between the rim and the sections of the tire-holder and spaced and extending circumferentially of the rim, each spring being attached at one end to the rim and bearing at its other end outwardly against adjacent lugs of adjacent sections of the tire-holder.

2. In a vehicle-wheel, the combination, with the rim of the wheel, and a tire extending circumferentially of the rim and enough larger in internal diameter than the external diameter of the rim to form an annular space between the tire and the rim, of a tire-holder comprising metal sections extending along the inner circumferentially extending surface of the tire, adjacent sections of the tire-holder being pivoted together at their adjacent ends parallelly with the axis of the wheel, each section of the tire-holder being provided with two flanges overlapping opposite sides respectively of the tire and having two inner laterally spaced flanges projecting into and partially across the aforesaid space; a metal band extending circumferentially of the rim and provided with two flanges loosely overlapping the outer side of opposite inner flanges respectively of each section of the tire-holder; leaf-springs arranged between the said band and the tire-holder and extending and spaced circumferentially of the rim, each spring bearing at one end outwardly against adjacent ends of adjacent sections of the tire-holder, and means whereby the said spring and the aforesaid band are removably secured at the other end of the spring to the rim.

In testimony whereof, I sign the foregoing specification, in the presence of two witnesses.

CHARLES B. NICHOLS.

Witnesses:
 C. H. DORER,
 B. C. BROWN.